April 1, 1924.
A. C. PRATT
1,488,614
METHOD OF AND APPARATUS FOR MAKING GROMMETS
Filed Nov. 6, 1919 4 Sheets-Sheet 1
Fig. 1,
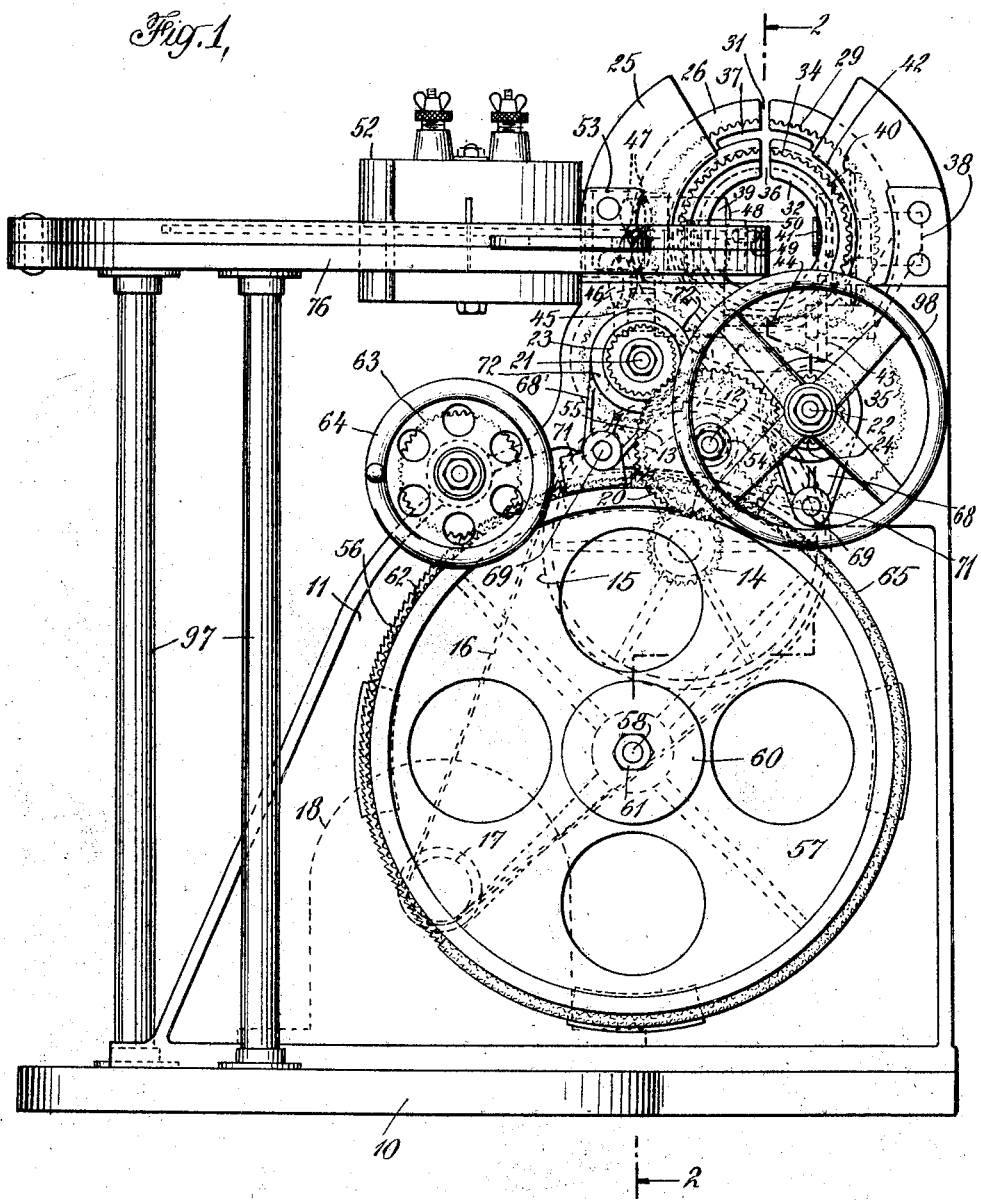
Inventor
A. C. Pratt,
By his Attorneys

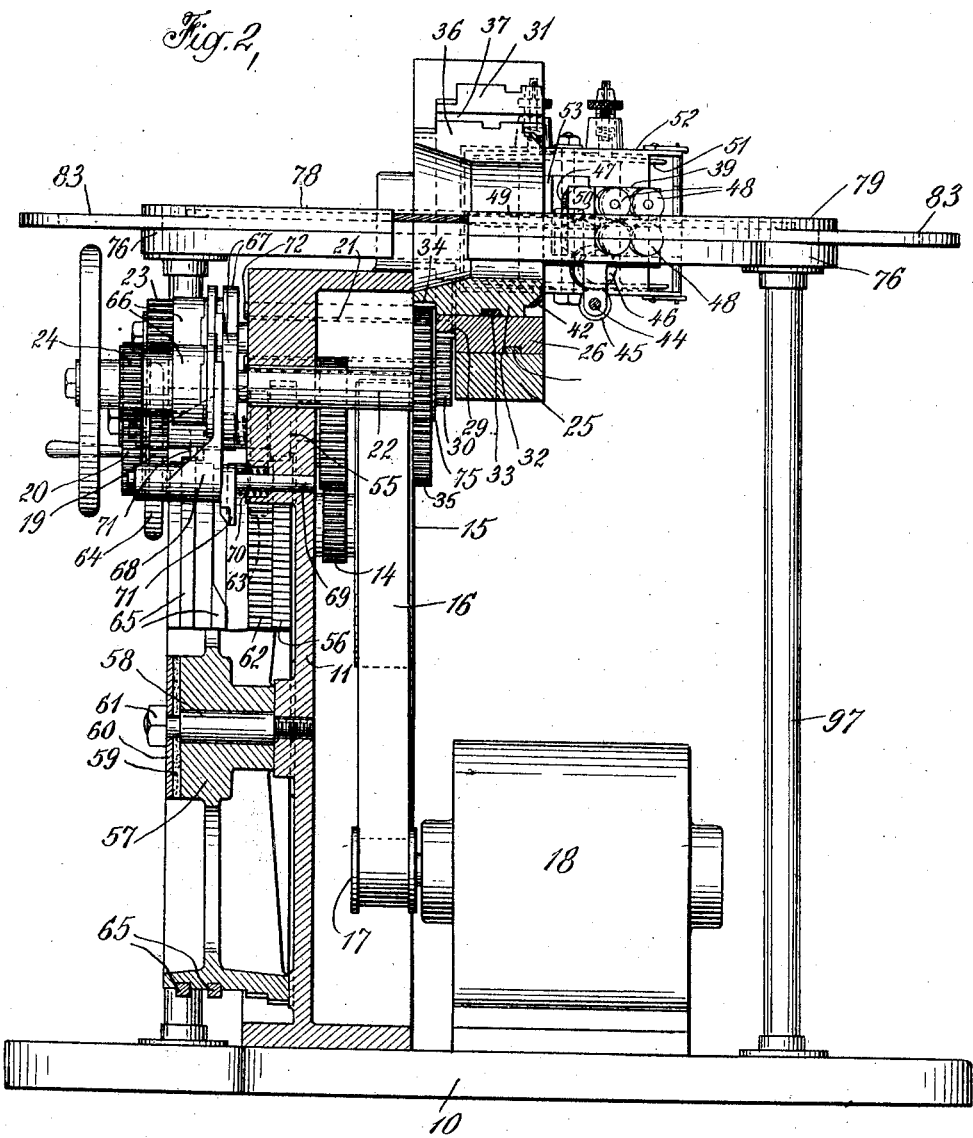

April 1, 1924.
A. C. PRATT
1,488,614
METHOD OF AND APPARATUS FOR MAKING GROMMETS
Filed Nov. 6, 1919     4 Sheets-Sheet 3
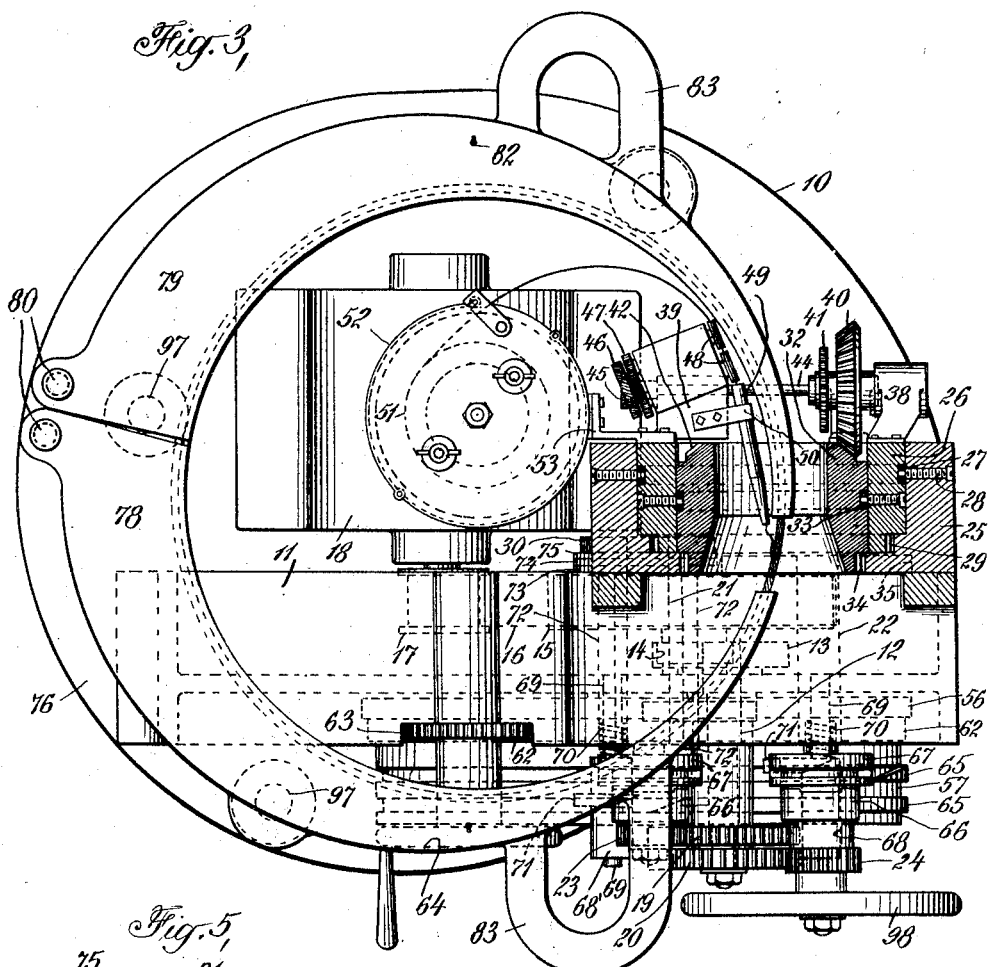
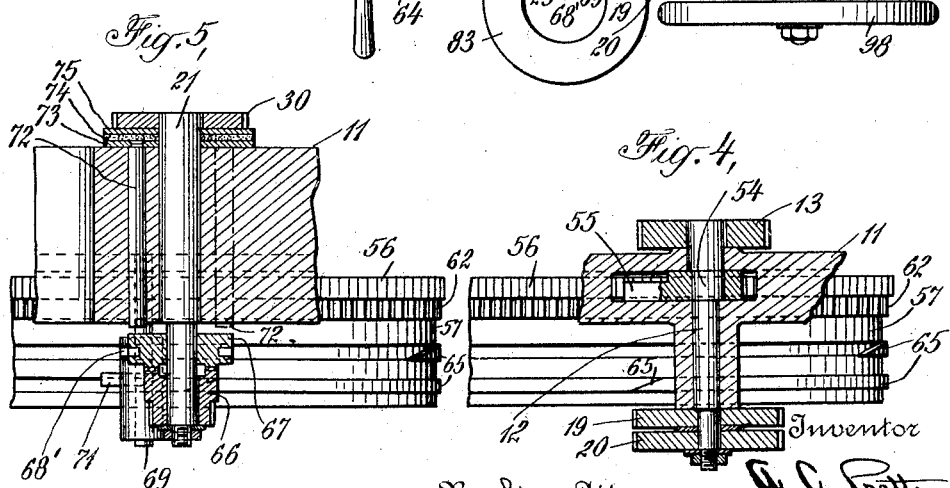

April 1, 1924.
A. C. PRATT
1,488,614
METHOD OF AND APPARATUS FOR MAKING GROMMETS
Filed Nov. 6, 1919
4 Sheets-Sheet 4
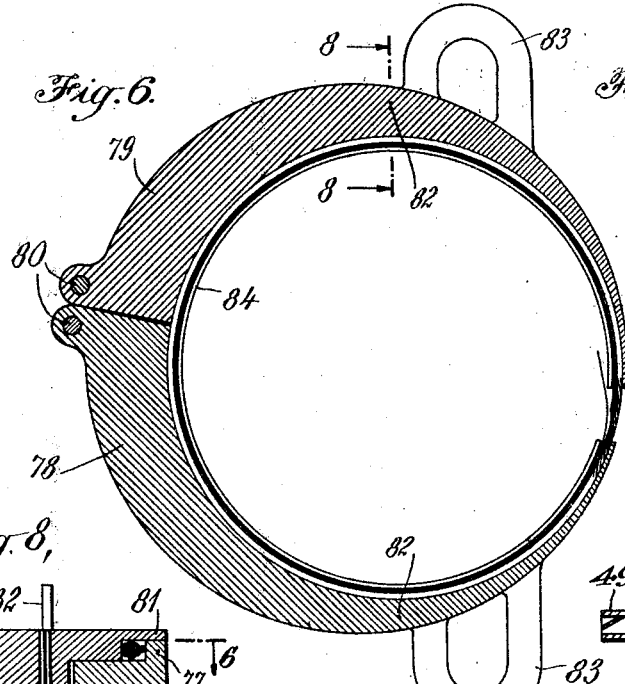
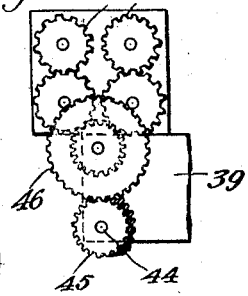
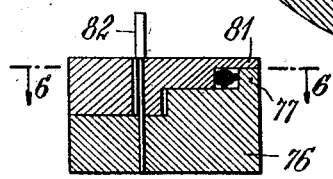
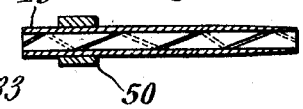
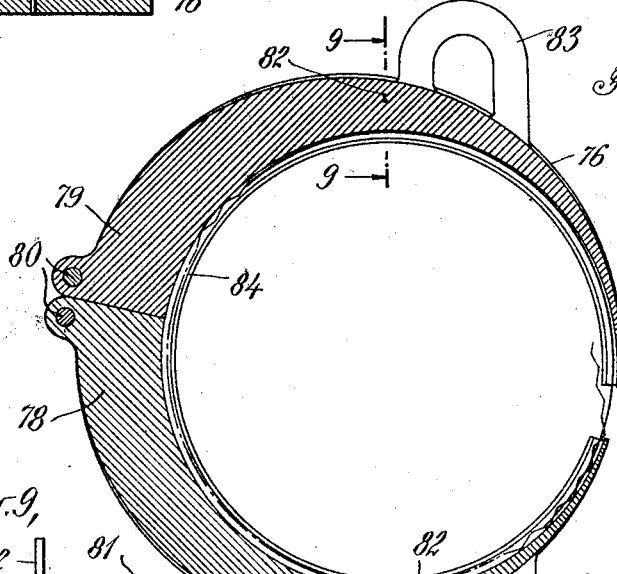
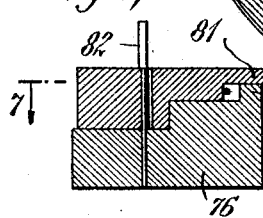

Patented Apr. 1, 1924.

1,488,614

UNITED STATES PATENT OFFICE.

ALPHONSO COMSTOCK PRATT, OF ERIE, PENNSYLVANIA, ASSIGNOR, BY MESNE ASSIGNMENTS, TO AMERICAN CHAIN COMPANY, INC., A CORPORATION OF NEW YORK.

METHOD OF AND APPARATUS FOR MAKING GROMMETS.

Application filed November 6, 1919. Serial No. 336,115.

*To all whom it may concern:*

Be it known that I, ALPHONSO COMSTOCK PRATT, a citizen of the United States, residing at Erie, in the county of Erie, State of Pennsylvania, have invented certain new and useful Improvements in Methods of and Apparatus for Making Grommets; and I do hereby declare the following to be a full, clear, and exact description of the invention, such as will enable others skilled in the art to which it appertains to make and use the same.

This invention relates to machines for use in the manufacture of grommets of the type used extensively in the manufacture of automobile tires. In particular, the invention relates to a machine of the type disclosed in United States Letters Patent No. 1,294,160 granted to me February 11, 1919. That patent discloses a machine for making grommets having a rotating shuttle through which the axis of the grommet passes, a die or quill provided with a spiral passage mounted on the shuttle so as to rotate therewith and means for feeding a length of wire through the spiral passage in the die as the die is rotated by the shuttle. In forcing the wire through the spiral passage in the die, the wire is given a spiral conformation and the rotation of the die about the axis of the grommet causes these spirals of the wire to be laid upon the surface of the partially completed grommet.

The present invention relates to a machine of this type for making a grommet and involves the provision of improvements whereby the machine is made automatic in its operation, thus materially reducing the time required for the manufacture of a grommet and correspondingly reducing the cost of production of the grommets.

Grommets of the type made on the machine preferably consist of a core of straight wire and convolutions of spirals, preferably six convolutions of spirals, laid about this core wire with their spirals lying side by side and completely enclosing the core wire. The grommet is made from a single continuous piece of wire, each of the two end portions of the piece of wire constituting half of the core and the intermediate portion of the length of wire constituting the convolutions of spirals which are wound upon the core. Thus the ends of the single continuous piece of wire are enclosed within the convolutions of spirals and strains tending to expand the grommet as a whole cause the spirals to grip the enclosed core more tightly.

In the machine of the patent above referred to, the wire was forced through the spiral passage of the die to give it the spiral configuration, and at the conclusion of the operation of spiraling the wire, the die was removed and the feeding devices for the wire operated so as to feed out a length of straight wire which would serve for the core or a portion thereof. In order to take out the die it was necessary to discontinue operation of the machine and start it in operation again after the die has been removed.

I have discovered that in the manufacture of such grommets, wire may be forced through a die having a spirally formed passage therethrough and be made to issue from the end of the passage through the die either in the spiral conformation appropriate for the surface convolutions of a grommet or perfectly straight and appropriate for the core wire of a grommet, as desired. By taking advantage of this discovery, the operation of manufacturing grommets is greatly facilitated and may in fact be made automatic. This is due primarily to the fact that it is unnecessary to stop the operation of the machine after the convolutions of spiral wire have been formed and then to take out the die preparatory to operating the feeding devices so as to feed the straight wire for the core.

If a machine such as that shown in the patent above referred to be operated to feed wire through a die having a spiral passage therethrough and the wire issuing from the die be allowed to pass freely therefrom, the wire will be given a spiral conformation appropriate for the surface convolutions of a grommet. On the other hand, if the machine be operated under the same conditions except that the end of the piece of wire issuing from the die be held so that it cannot rotate about its own axis, as by gripping the end of the piece of wire with a pair of pincers, the wire will issue from the die perfectly straight. This may be utilized in a machine for making grommets by providing automatic mechanism for discontinuing the rotation of the die bodily about the axis of a partially completed grommet after the convolutions of spirals have been placed upon the grommet but continuing the operation of the feeding devices for feeding wire through the die; under those conditions, the portion of the grommet already formed, including the plurality of convolutions of spirals, will serve to hold the wire forced through the die thereafter from turning upon its own axis and the wire will therefore issue from the die in a straight condition. This is a most important improvement upon the type of grommet machine disclosed in my patent above designated for it permits of continuous operation of the machine in manufacturing grommets in practically complete form. The change from operation to feed spiral wire from the die to operation to feed straight wire from the die may be effected instantaneously and automatically by merely operating a clutch mechanism for discontinuing the rotation of the die about the axis of the partially completed grommet. Such operation of the clutch mechanism may be effected automatically by a suitable counting mechanism which counts the number of spirals formed in the wire and effects the automatic shift from spiral wire to straight wire after the machine has formed a number of spirals sufficient for six or any other desired number of complete convolutions of spiral wire. Thereafter the machine will be operated to feed straight wire from the die and this operation may continue until enough straight wire has been provided for completing the core of the grommet being made and providing a portion of the core for the next grommet to be made on the machine.

In employing the feature of improvement above outlined, I prefer to employ two shuttles rotated about the axis of the grommet being made, one of them carrying the die and the feeding mechanism for feeding wire through the die and the other arranged to have its rotation cause operation of the feeding mechanism for the wire. These two shuttles are provided with independent driving mechanisms each controlled by a clutch mechanism. In feeding the spirally formed wire, both shuttles are rotated simultaneously so as to cause both operation of the wire feeding mechanism and rotation of the die about the axis of the grommet. After a sufficient length of spirally formed wire has been made, the clutch in the driving mechanism for the shuttle carrying the die and the feeding mechanism is operated to bring that shuttle to rest and the continued rotation of the other shuttle causes the wire feeding mechanism to be operated to feed wire through the die, but under these conditions, straight wire issues from the die because the wire is held from rotation about its own axis by its connection to the portion of the grommet already made.

The features of the invention above referred to will be better understood by reference to the following description of the preferred embodiment of the invention which is illustrated in the drawings annexed hereto. It is to be understood, however, that the invention is not limited to this particular construction but may be embodied in machines differing widely as to their structural characteristics.

In these drawings, Fig. 1 is an elevation of the machine; Fig. 2 is a sectional elevation, the section being along the line indicated at 2—2 on Fig. 1; Fig. 3 is a view partially in plan and partially in horizontal section through the center of the two shuttles; Fig. 4 and 5 are detail views in horizontal sections; Figs. 6 and 7 are detail views in horizontal section through the holder for the grommet, the section lines being indicated at 6—6 and 7—7 on Figs. 8 and 9; Figs. 8 and 9 are detail views in vertical section on lines 8—8 and 9—9 of Figs. 6 and 7 respectively. Fig. 10 is an end view of the wire feed mechanism showing the arrangement of gearing, and Fig. 11 is a sectional view of the die for spiralling the wire.

Referring to the drawings, the machine includes a base 10 upon which is erected a frame 11 and in this frame are bearings for a main driving shaft 12. This shaft carries a gear 13 in mesh with a pinion 14 on a shaft also journaled in the frame 11 and on this shaft is a pulley 15 connected by a belt 16 to a pulley 17 on the shaft of a motor 18 mounted on the base 10. At the end of the main driving shaft 12 opposite that on which the gear 13 is mounted are two gears 19 and 20 which are secured to the shaft 12. These two gears are employed for driving two shafts 21 and 22 which are mounted in bearings in the frame 11 parallel to and on opposite sides of the shaft 12. Loosely mounted on the shaft 21 is a pinion 23 in mesh with the gear 19 and loosely mounted on the shaft 22 is a pinion 24 in mesh with the gear 20. These two loosely mounted pinions 23 and 24 may be connected to their respective shafts by clutch mechanisms hereafter described so that either or both of the shafts 21 and 22 may be driven from the shaft 12 through the gears 19, 20, 23 and 24.

On the upper part of the standard 11 is mounted a saddle or bearing block 25 formed to provide a bearing therein; this bearing is not a closed bearing but is open on its upper side as is indicated in Fig. 1. Rotating within this bearing is a shuttle 26. This shuttle has a peripheral groove which receives a ring 27 (Fig. 3) secured to the bearing 25 by screws 28. At one end of the shuttle 26 the exterior surface of the shuttle is provided with gear teeth 29. These gear teeth mesh with the teeth of a pinion 30 which is rigidly secured to the shaft 21 so that the shuttle will be rotated by that shaft within the bearing 25. The shuttle 26 has a radial opening 31 therethrough as shown in Fig. 1. This opening is a narrow one preferably, the width of the space between two of the gear teeth, and is provided for the purpose of permitting the removal of a completed grommet from within the shuttle.

Inside the shuttle 26 is another shuttle 32. This shuttle is also provided with a peripheral groove in which lies a ring 33 secured to the shuttle 26 by screws similar to the screws 28. The shuttle 32 is provided with gear teeth 34 at one of its ends and these gear teeth mesh with the teeth of a gear 35 secured upon the shaft 22. The inner shuttle 32 is also provided with a radial opening as shown at 36 to permit the removal of a grommet from within the shuttle. The outer shuttle 26 has its inner wall cut away on either side of the radial opening 31 as shown at 37 in Fig. 1 so that if the two radial openings 36 and 31 are fairly close to, but not exactly in alignment, a grommet may be removed by passing it through the radial opening 36 in the inner shuttle, then moving it laterally in the space 37 and finally passing it through the radial opening 31.

On the side face of the outer shuttle 26 are secured two supports 38 and 39 which carry the wire feeding mechanism and the die. In the support 38 is a bearing for a short shaft on which is mounted a bevel gear 40 and a spur gear 41. The bevel gear 40 meshes at all times with bevel gear teeth 42 on the adjacent end of the inner shuttle 32. The spur gear 41 is secured to the bevel gear 40 and meshes with a pinion 43 (Fig. 1) on a shaft 44 extending across the end of the inner shuttle below the center thereof. This shaft 44 at its opposite end carries a spiral gear 45 in mesh with a similar gear 46 which is connected by gearing 47 to the shafts of two pairs of wire feeding rollers 48. These wire feeding rollers are adapted to grip a length of wire between them and force the wire into and through a spiral passage through a die 49 mounted upon the support 39. This die 49 is held between the jaws of a clamp 50 so that the die may be turned about its axis to adjust it to the proper position and then held in that position by the clamp 50.

The wire fed by the rollers 48 is drawn from a reel 51 mounted for rotation within a cylindrical casing 52 and this casing is mounted upon the outer shuttle 26 by being secured to an arm 53 which is fastened to the side face of the shuttle 26.

The operation of the parts so far described is as follows:

When the motor 18 is in operation and the gears 23 and 24 are clutched to their shafts 21 and 22, the rotation of the main shaft 12 causes rotation of the side shafts 21 and 22 and the gears 30 and 35 carried thereby. These two gears 30 and 35 are in mesh with the gear teeth formed on the outer and inner shuttles 26 and 32 so that the outer shuttle is rotated within the bearing 25 and the inner shuttle is rotated within the outer shuttle. The gearing is so arranged that the two shuttles rotate in the same direction but the inner shuttle rotates at a speed considerably in excess of the speed of rotation of the outer shuttle. Preferably the inner shuttle rotates at double the speed of the outer shuttle. As the outer shuttle is revolved, the die 49 is rotated bodily about the center line of the shuttle, that is, about a partially formed grommet extending centrally through the two shuttles. Also, as the outer shuttle is rotated to carry the die around, the outer wire-feeding mechanism with its driving gear including the gears 40 and and 41 and the wire-supplying devices including the reel 51 are rotated with it. At the same time, however, the inner shuttle 32 is also rotated, and at a speed in excess of the speed of rotation of the outer shuttle so that there is a rotation of the inner shuttle relative to that of the outer shuttle. Such relative rotation of the two shuttles causes the gear 41 to be turned about its axis while it is being revolved with the outer shuttle and this rotation of the gear 40 actuates the entire wire feeding mechanism, that is, it causes rotation of the wire-feeding rollers 48 which draw wire from the reel 51 and force it through the spiral passage of the die 49. When the parts are operated in this manner to feed wire through the die 49 while the die is being rotated about the center line of the shuttles, the wire will be bent by its passage through the spiral opening through the die, and, (if no means are provided for preventing it), will issue from the die in the form of a succession of spirals. It will be noted also that if rotation of the outer shuttle 26 be discontinued and the inner shuttle 32 only be rotated, the feeding rollers 48 will be operated as before to feed wire through the spiral passage of the die 49 but such feeding movement of the wire through the die will not be accompanied by rotation of the die, the wire-feeding devices and the wire supplying devices about the center line of the shuttles.

On the main driving shaft is an eccentric 54 (Fig. 4) which lies within an opening in a pawl 55. This pawl runs upon ratchet teeth 56 on a large counting wheel 57 pivotally mounted upon the frame 11 by means of a stub shaft 58. In order to guard against over-running of wheel 57 when it is moved by the pawl, one face of the wheel is arranged to bear upon pads on the frame 11 and the wheel is provided with a large hub in contact with a fibrous washer 59. This washer is forced into contact with the face of the hub of the wheel by a metal washer 60 and a nut 61 which may be screwed upon the threaded end of the stub shaft 58. Adjacent to the ratchet teeth 56, the wheel 57 is provided with gear teeth 62 which mesh with the teeth of a gear 63 (Fig. 1) mounted on a shaft journaled in the frame 11 and provided with a hand wheel 64. By turning this hand wheel, the position of the large wheel 57 may be regulated as desired. Cams 65 may be secured upon the surface of the wheel 57 in various positions of adjustment. Each of these cams is provided with a beveled end as indicated in Figs. 3 and 4 and also the cams may be sectional so that their length may be adjusted as desired.

As above stated, each of the pinions 23 and 24 is loosely mounted upon its shaft 21 and 22 respectively. Each of these pinions 23 and 24 is integral with a sleeve 66 whose end is formed to provide clutch teeth as shown in Figs. 2 and 3. Each of these clutch members cooperates with a clutch member 67 which is splined upon its shaft. Also each clutch member 67 has a peripheral groove which receives the bifurcated end of a clutch operating member 68. This member 68 is mounted loosely upon a rod 69 which projects laterally from the frame 11. It is moved outwardly from the frame, to the left in Fig. 2, by a spring 70 coiled upon the rod 69 and seated in a cavity in the frame 11. When so moved outwardly, the member 68 carries with it the clutch member 67 and causes clutch teeth on the side of that member to cooperate with clutch teeth on the sleeve 66 of the pinion 24 and thereby lock the pinion 24 to the shaft 22. When the member 68 is in this outer position, an arm 71 integral with the member 68 and depending therefrom lies in the path of movement of one of the cams 65 on the wheel 57 and the rotation of this wheel causes the cam to engage the arm 71 and move the clutch operating member 68 against the tension of spring 70 so as to disengage the two clutch members and thus discontinue driving the shaft 22 through the gears 20 and 24. The construction and arrangement of the clutch mechanism above described in connection with the shaft 22 is duplicated on the shaft 21 for effecting connection between the shaft 21 and the gear 23 by which it is driven from the main shaft 12. For convenience in distinguishing between the clutch operators for the clutches of these two shafts 22 and 21, the clutch operator for the clutch on shaft 22 is designated 68 and the clutch operator for the clutch on shaft 21 is designated 68'. When the clutch on shaft 21 is operated to discontinue the drive of shaft 21, it is important that that shaft should come to rest at once.

For this purpose such a construction as that illustrated in Fig. 5 may be employed. This includes rods 72 loosely mounted in openings in the frame 11 in such position that their ends may be engaged by the clutch member 67 when that member is moved to to the right in Fig. 2. The opposite ends of these rods are secured to a metal disc 73 which contacts with a fibrous disc 74 and on the opposite side of this disc is a metal disc 75 secured to the gear 30 which drives the outer shuttle 26. Thus, when the clutch members of shaft 21 are disengaged, the discs 73, 74 and 75 are pressed into engagement by the lengthwise movement of the rods 72 with the result that the gear 30 and the parts driven thereby are brought to rest immediately.

The grommet being made upon the machine is sustained by a support 76 mounted on pillars 97 rising from the base 10. This support is of annular form except that it is open over a short space within the shuttles. It is preferably of considerable width on one side and tapers to a less width from there around to the portion lying within the shuttles. As shown in Figs. 8 and 9, this support 76 has an upwardly projecting wall 77 at its inner side. Mounted on this support 76 are two cover plates 78 and 79. These are pivotally mounted at 80 diametrically opposite the shuttles. Each of these cover plates is of reduced thickness adjacent to its inner edge as shown at 81 in Figs. 8 and 9. Thus, the body portions of the support 76 and cover plates 78 and 79 and the projecting walls 77 and 81 of those parts form between them an annular passage of rectangular cross-section in which a grommet may be built up and around which the grommet may be moved during the process of building.

As shown in Fig. 9, the support 76 and the cover plates 78 and 79 may be provided with openings to receive pins 82 adapted to hold the cover plates 78 and 79 in such positions that the opening in which the grommet is formed is of rectangular cross-section. The cover plates 78 and 79 may be provided with additional openings, such that the pins 82 may be withdrawn, the cover plates moved outwardly slightly, and the pins 82 then inserted through the other openings in the cover plates as shown in Fig. 8 so as to enlarge the opening for the grommet. To facilitate moving the cover plates 78 and 79 they are provided with integral handles 83.

The operation of the machine will now be described:

Preliminary to putting the machine in operation, the counting wheel 57 is positioned as required by turning the hand wheel 64 and thereby moving one of the cams 65 to the required distance from the clutch operating member 68 operated by it. It is best to position the wheel 57 with reference to the position of the cam 65 which actuates the clutch-operating member 68' (Fig. 1) for controlling the shaft 21 driving the outer shuttle. For this purpose the end of this cam 65 should be moved so far around from the clutch operating member 68' that during the advance of the wheel 57 to carry that cam into engagement with the clutch operator, the requisite amount of spiraled wire will be fed, that is, the operation of the machine during this time will result in feeding an amount of spiraled wire sufficient for a predetermined number, preferably 6, convolutions of spirals upon the completed grommet. This having been done, the other cam 65 is positioned upon the surface of the wheel 57 so that it will come into the position for actuating the clutch operator 68 controlling the shaft 22. The position of this cam should be such that after rotation of the outer shuttle has been arrested by actuation of the clutch member 68', rotation of the inner shuttle will continue until the appropriate length of straight wire has been fed through the die whereupon the clutch operator 68 of the shaft 22 will be actuated to discontinue rotation of the inner shuttle. The two cams 65 upon the counting wheel 57 are preferably of such length that when the wheel 57 has been positioned as above indicated, the ends of the cams will be about to move from under the clutch operating devices 68 and 68' so as to release those devices and allow them to be thrown in by their springs to clutch the shafts 21 and 22 to the main shaft 12.

At the start of the operation of the machine, a length of straight wire extends from the end of the die 49 into the opening for the grommet between the support 76 and the cover plates 78 and 79 with their walls 77 and 81 and this piece of straight wire extends around within this opening for the grommet at least half way and preferably somewhat more than half way. The end of the wire preferably aligns exactly with a mark provided for the purpose upon these parts of the supporting structure for the grommet.

The switch controlling the circuit of the motor 18 is then closed and the main shaft 12 is thus put in operation. Each rotation of this main shaft causes one reciprocation of the pawl 55 and in each reciprocation the counting wheel 57 is rotated a distance represented by one tooth of the ratchet 56 thereon. The first one or two step movements of the counting wheel 57 carry the cams 65 thereon from coaction with the clutch operators 68 and 68' and both of these clutch operators are actuated by their springs 70 to move to the left in Fig. 2. This carries the clutch members 67 which are splined on the shafts 21 and 22 into engagement with the clutch members 66 which are loose on those shafts. In this way the pinions 23 and 24 are locked to the shafts 21 and 22 respectively and as these pinions are in mesh with the gears 19 and 20 on the main shaft 12, rotation of the side shafts 21 and 22 starts. These two shafts carry pinions which are in mesh with gears on the inner and outer shuttles and therefore the two shuttles begin to rotate in the same direction, the outer shuttle rotating in the bearing 25 and the inner shuttle rotating within the outer shuttle. The gears for driving the two shuttles are so selected that the inner shuttle rotates at a speed substantially double that of the outer shuttle. The rotating outer shuttle carries with it the entire wire-supplying devices, the entire wire feeding devices and the die or quill 49 provided with the spiral passage through it. The rotation of the inner shuttle relatively to the outer shuttle causes operation of the wire feeding devices by reason of the inter-meshing gears 42 on the inner shuttle and 40 on the outer one. Therefore, as the two shuttles rotate, wire is drawn from the reel 51 and fed by the feeding wheels 48 into and through the spiral passage of the die 49 and the wire issues from the outlet end of the die as spirally formed wire. The wire issuing from the die is so indicated on Fig. 3 and also on Fig. 7. As this spirally formed wire is fed out from the die, it passes into the annular opening in the support for the partially formed grommet and pushes around within that opening the portion of the grommet already formed. In Fig. 7 the grommet is represented diagrammatically as it appears after a little more than one convolution has been formed. At the start of the operation, straight wire extends into the opening for the grommet being made and around within that opening to a point indicated by the reference 84. This operation of the machine to spiral wire and feed that wire from the die causes this semi-circular piece of straight wire to be pushed around ahead of it and the spirally formed wire to enter the opening for the grommet. As shown in the Figure, somewhat more than one-half a convolution of spiraled wire has been made and fed into the opening for the grommet and the straight wire for the core in advance of this spirally formed wire has been moved around so that it extends past the opening in the holder for the grommet and its extreme end is encircled by several spirals of the spirally formed wire. Operation of the machine in this manner continues while wire for several convolutions of the grommet is spiraled and fed into the support for the grommet being made. The forcing of the wire through the spiral passage in the die gives to the wire the spiral configuration required for the particular type of grommet being made, and the rotation of the die about the center line of the shuttle, while the spirally formed wire is issuing from the die, causes the spiraled wire to be laid upon the surface of the grommet being made in the desired manner. After one convolution of spirals has been laid upon the core, the spirals of the second convolution take position closely adjacent to those of the first convolution and this is continued with subsequent convolutions until the whole surface of the grommet is covered. Care must be exercised in so adjusting the machine as to cause the spirals of the second convolution to lie closely adjacent to those of the first convolution. This may be done by selecting gears 20 and 24 of the requisite number of teeth, the rate of feed of the wire being changed as the ratio of the teeth in these two gears is changed.

It will be noted that at the start of the operation the straight piece of wire for the core extends only part way around the opening in which the grommet is built up. Therefore, a portion of the grommet built by the machine will be provided with a core whereas the remainder will have no core. The application of the convolutions of spirals does not require that there be a core as the wire for the convolutions of spirals is given its appropriate configuration by the die and not by reason of its application to a core. For this reason it is necessary that after the feeding of spiraled wire and the application of convolutions of spirals to the grommet being made has been completed, a length of straight wire should be fed sufficient for completion of the core of the grommet. This straight wire for the core is fed by the same wire-feeding devices and through the same die as the spiraled wire and the change from the feed of spiraled wire to the feed of straight wire is effected automatically without discontinuing the operation of the machine. As stated above, the cam 65 is so set with relation to the clutch actuator 68' operated by it that it will engage and operate the clutch actuator 68' after the requisite amount of spiraled wire has been fed through the die. The form of grommet which I prefer to make is one having a core of straight wire and six convolutions of spiral wire applied to this core with the spirals of the six convolutions lying side by side entirely around the grommet, this grommet being made from a single continuous piece of wire whose ends constitute the core and whose central portion constitutes the exterior coils of spirals. In making such a grommet, the cam 65 operating the clutch actuator 68' would be so set that it would engage the clutch actuator 68' at the completion of the feed of an amount of spiraled wire sufficient for six convolutions of spirals.

On engagement of the cam 65 with the clutch actuator 68', the clutch member 67 on the shaft 21 is moved to uncouple the clutch and thereafter the cam 65 holds the clutch uncoupled. This causes the shaft 21 to be brought to rest at once, particularly as the movement of the clutch member 67 operates through the rods 72 to apply a brake to the shaft. This results in discontinuing the drive of the outer shuttle 26 so that the shuttle, the wire-supplying devices, the wire-feeding devices and the die all come to rest. Rotation of the inner shutter, however, is continued at the same speed as before, therefore at double the former speed relatively to the outer shuttle. This continued rotation of the inner shuttle causes operation of the wire-feeding devices and wire is fed through the die as before. But the torque of the wire fed under these conditions is resisted by the attachment of the wire to the partially completed grommet already formed. The effect of this is that the wire issues from the die in a straight condition instead of in a spiraled condition as theretofore when the wire as a whole was rotated about the center line of the shuttles. Operation in this way continues with straight wire fed through the die and the partially completed grommet moved around in its support, the condition of the parts being that represented in Figs. 6 and 8. At this time the grommet is complete so far as outward appearance is concerned and the straight wire which is fed takes position beside the grommet as is shown in Fig. 8. Procedure in this manner is continued until a complete convolution of straight wire is fed through the die and lies beside the grommet as is indicated in Fig. 8. This complete convolution of straight wire is to serve to complete the core of the grommet being made and to constitute half of the core of the next succeeding grommet to be made. After this one complete convolution of straight wire has been fed through the die, the second cam 65 comes into engagement with the clutch operator 68 for the clutch controlling shaft 22. This operates that clutch and brings shaft 22 to rest together with the inner shuttle driven by the shaft 22. The operator then removes the pins 82 holding the pivoted cover plates 78 and 79 and turns the two cover plates back sufficiently to expose the grommet lying beside the wall 77 of the support. He then cuts the convolution of straight wire lying beside the partially completed grommet at an indicated point which may be the point indicated at 84 on Fig. 7. The grommet is then complete except that half of its core lies outside of the grommet. This partially completed grommet is removed from the machine by passing it through the slots 31 and 36 of the two shuttles. In order to bring these two slots to positions permitting removal of the grommet, it may be necessary to manipulate the hand wheel 98 on shaft 22 more or less. The two slots do not have to be in alignment on account of the provision of the cut away space 37 in the interior of the outer shuttle. The grommet having been so constructed, it is completed by inserting the remainder of the core wire in the space in the interior of the grommet. This is an operation requiring but a few seconds as the wire may be readily pushed between convolutions of spirals and snaps into the opening within the grommet. If the cuts in the wire at the begining and ending of successive operations of making grommets have been accurately made, the two ends of the core will lie very close together within the surrounding casing of spirals.

It will be noted that at the conclusion of the operation of making a grommet as above outlined, the wire extending from the end of the die into the opening for a partially completed grommet is straight wire and extends around within the opening to the point 84. This piece of straight wire constitutes a portion of the core of the next grommet to be made on the machine. Preparatory to making the next grommet, it may be necessary for the operator to give the hand wheel 64 a turn or two to position the cams 65 properly but this would only be necessary in case the machine were being used for making grommets of a size smaller than that for which the machine is designed.

In Fig. 9 the opening for the grommet between the vertical walls of the cover plates and the vertical wall 77 of the support 76 is of rectangular shape and of a width approximately equal to the diameter of the completed grommet and the pin 82 is in the outer of the two holes in the cover plate. in Fig. 8 one of the two cover plates is shown as having been moved outwardly slightly and the pin 82 placed in the inner hole. The space for the grommet is therefore slightly wider to accommodate the completed grommet and also one additional length of wire to be used as core wire. Fig. 9 shows one strand of wire in the opening for the grommet as would be the case at the beginning of the operation of making the grommet, and Fig. 8 shows a completed grommet and an additional strand of wire in the space as would occur near the conclusion of the operation of making a grommet. Such an arrangement of the parts may be employed if accurate sizing of the grommets for diameter is not necessary.

When more accurate sizing is desired, I prefer to so position the holes for the pins 82 as to provide for holding the cover plate 79 or both cover plates 79 and 78 in positions in which the space for the grommet is further contracted, contracted to a size closely approximating the diameter of the wire from which the grommet is made. Under such conditions the cover plates 78 and 79, and particularly the cover plate 79, serve as calipers for determining the diameter of the completed grommet. At the beginning of the operation of making the grommet, when wire is fed into the space within the plates 76, 78 and 79, it holds closely to the outer wall of that space, that is, the vertical wall on the cover plates 78 and 79, but as the end of the wire passes around along the vertical wall of the cover plate 79, especially along the portion of that wall near the end distant from the pivot of the cover plate, it cannot be depended upon to hold closely to the outer wall of the space for the grommet and variation in the diameter of the grommets might occur depending on whether or not the wire held close to the outer wall of the space. To avoid variation in the diameter of the grommets caused by this, the two cover plates 78 and 79 or the cover plate 79 only may be moved inward about their pivots so that the space along the wall 77 of the support in which the grommet is made, or a portion of that space, is of a width substantially equal to the diameter of the wire from which the grommet is made. If only the cover plate 79 were so moved inwardly, this would suffice and the space for the grommet would be of decreasing width from the pivoted end of the cover plate 79 around to its free end where the space would be of a width substantially equal to the diameter of the wire. The cover plate 79 should be locked in this position by some such means as the pin 82. Then, during the initial stage of making the grommet, the end portion of the piece of wire will hold close to the outer wall of the space in which the grommet is formed, that is, the vertical wall of the cover plate 79. As the end of the wire moves around across the break in the support where the shuttles rotate and enters the space under the cover plate 78, that end of the wire is gripped by the spirals of the second convolution and after a certain number of spirals of the second convolution, say a dozen spirals, have been applied to the end portion of the straight core wire, the core wire will be so effectively gripped by the spirals applied thereto as to avoid any possibility of slipping of the spirals upon the core resulting in a change of the diameter previously established. Therefore, at any time after a dozen or more spirals of the second convolution have been applied to the core wire, the cover plate 79 need no longer be held in this inner position in which a portion of the space in which the grommet is made is of a reduced width equal to the diameter of the wire. The cover plate may be moved out to the position in which it is shown in Fig. 8 in which the space in which the grommet is made is of ample width to accommodate the completed grommet and the additional strand of wire for completing the core and for a portion of the core of the next grommet to be made. The movement of the cover plate or caliper 79 from the inner to the outer position might be effected automatically at the required moment but usually it is desirable to stop the operation of the machine after some few of the spirals of the second convolution have been made in order to inspect the relation of the end of the core to the overlying spirals and the cover plate 79 may readily be moved from its inner to its outer position when the machine is so stopped.

I claim:

1. The method of making a grommet which comprises feeding wire through a die to give the wire a spiral configuration and at the same time rotating the die, the wire-feeding devices and the supply of wire about the center line of the grommet being made, and thereafter operating the wire-feeding devices to feed wire through the die without rotating the die and the feeding devices about the grommet.

2. The method of making a grommet which comprises feeding through a die having a spiral passage, the wire for a plurality of convolutions of a completed grommet while rotating the die, the wire-feeding devices and the supply of wire about the center line of the grommet being formed, thereafter operating the feeding devices to feed wire through the die without rotating the die and the wire-feeding devices about the grommet to supply one convolution of straight wire, and then cutting the wire of this straight convolution at a point intermediate its ends to provide on the end of the convolutions of spiraled wire a length of straight wire which is to constitute a portion of the core of the grommet.

3. The method of making a grommet which comprises feeding wire through a die for giving the wire a spiral configuration and at the same time rotating the die, the wire-feeding devices and the supply of wire about the center line of the grommet being formed, measuring the spiraled wire fed from the die, discontinuing the rotation of the die, the wire-feeding devices and the supply of wire after a predetermined amount of spiraled wire has been fed from the die and continuing the operation of the wire feeding devices thereafter to feed straight wire from the die to constitute the core of the grommet.

4. The method of making a grommet which comprises forcing wire through a die having a spiral passage therethrough and causing the wire to issue from the die either as spirally formed wire to constitute the surface convolutions of the grommet or as straight wire to constitute the core of the grommet.

5. The method of making a grommet which comprises forcing wire through a die, causing a predetermined length of the wire to issue from the die as spirally-formed wire, applying this spirally-formed wire to the grommet being made in the form of a plurality of convolutions of spirals lying side by side about the grommet being formed, causing the wire to issue from the die as straight wire, and utilizing this straight wire to form the core of the grommet.

6. A machine for making grommets comprising the combination of a support for the grommet being made, a die having a spiral passage therethrough, means for forcing wire through the passage of the die, means for causing the wire to issue from the die as spiraled wire and for applying this spiraled wire to the surface of the grommet being formed and means for causing the wire to issue from the die as straight wire to constitute the core of the grommet.

7. A machine for making grommets comprising the combination of a support for the grommet being made, a die having a spiral passage therethrough, means for feeding wire through the passage of the die and at the same time rotating the die about the center line of the grommet being formed, whereby spirally-formed wire issues from the die and is applied to the grommet being made, and means for operating the wire-feeding means without rotating the die about the grommet whereby straight wire issues from the die to constitute the core of the grommet.

8. A machine for making grommets comprising the combination of a support for the grommet being made, two shuttles through which the grommet passes, means for rotating each of the two shuttles, a die, wire-feeding devices, and a support for a supply of wire mounted on one of the shuttles, and means on the other shuttle for operating the wire-feeding devices.

9. A machine for making grommets comprising the combination of a support for the grommet being made, two shuttles through which the grommet passes, a die mounted on one of the shuttles, wire-feeding devices mounted on that shuttle for feeding wire through the die and including a driving gear, a holder for a supply of wire also mounted on that shuttle, a gear mounted on the other shuttle and meshing with the driving gear of the wire-feeding devices and means for rotating the two shuttles at different speeds.

10. A machine for making grommets comprising the combination of a support for the grommet being made, two shuttles through which the grommet passes, a die mounted on one of the shuttles, wire-feeding devices mounted on that shuttle for feeding wire through the die and including a driving gear, a holder for a supply of wire also mounted on that shuttle, a gear mounted on the other shuttle and meshing with the driving gear of the wire-feeding devices and operating devices for rotating the two shuttles simultaneously at different speeds and for rotating the shuttle carrying said gear while the other shuttle is at rest.

11. A machine for making grommets comprising the combination of a support for the grommet being made, two shuttles through which the grommet extends, a die, wire-feeding means and a support for a supply of wire mounted on one of the shuttles, a gear on the other shuttle for operating the wire-feeding means and driving gear for rotating the two shuttles, each of the two shuttles having a slot therethrough to permit withdrawal of a completed grommet from within the shuttle.

12. A machine for making grommets comprising the combination of a support for the grommet being made, a bearing open on one side, a shuttle rotatable within the bearing and having a slot therethrough, a second shuttle rotatable within the first shuttle and having a slot therethrough, a die, wire-feeding means, and a support for a supply of wire mounted on one of the shuttles, a gear on the other shuttle for actuating the wire-feeding means and operating devices for rotating the two shuttles simultaneously and independently.

13. In a machine for making grommets, means for supporting the grommet being made consisting of a circular support having an upstanding wall extending along its inner edge and cover plates movably mounted upon the support and having depending walls whereby the support and cover plates and their walls form a circular opening of substantially rectangular form in which a grommet may be formed and around which the grommet may be moved during the process of making it.

14. A machine for making grommets comprising the combination of a support for the grommet being made, two shuttles through which the grommet passes, a die, wire-feeding means and a support for a supply of wire mounted on one of the shuttles, means on the other shuttle for actuating the wire-feeding means, and operating devices for rotating the two shuttles simultaneously at different speeds a predetermined amount and then automatically discontinuing the rotation of the shuttle carrying the die while the rotation of the other shuttle continues.

15. A machine for making grommets comprising the combination of a support for the grommet being made, two shuttles through which the grommet passes, a die, wire-feeding means and a support for a supply of wire mounted on one of the shuttles, means on the other shuttle for actuating the wire-feeding means, gearing for rotating the two shuttles simultaneously at different speeds, a member actuated by said gearing and means controlled by said member for discontinuing the rotation, by said gearing, of the shuttle carrying the die.

16. A machine for making grommets comprising the combination of a support for the grommet being made, two shuttles through which the grommet passes, a die, wire-feeding means and a support for a supply of wire mounted on one of the shuttles, means on the other shuttle for operating the wire-feeding means, two shafts each geared to one of the shuttles for driving the same, an operating shaft adapted to drive the said two shafts and two clutches each adapted to connect the operating shaft to one of the shafts geared to the shuttles.

17. A machine for making grommets comprising the combination of a support for the grommet being made, two shuttles through which the grommet passes, a die, wire-feeding means and a support for a supply of wire mounted on one of the shuttles, means on the other shuttle for operating the wire-feeding means, two shafts each geared to one of the shuttles for driving the same, an operating shaft adapted to drive the said two shafts, two clutches each adapted to connect the operating shaft to one of the shafts geared to the shuttles, a member actuated in accordance with the rotation of the shuttle carrying the die, and means actuated by said member for controlling the operation of said clutches.

18. In a machine for making grommets, a support of circular form, having an opening therein for the grommet being made around which the grommet is moved as it is made, and means for adjusting the width of the opening for the grommet during the operation of making the grommet, in combination with devices for spiraling wire to form a grommet and feeding the grommet around in the opening in the support.

19. In a machine for making grommets, a support providing a space within which the grommet is made by the machine, a member pivotally mounted on the support and having a wall thereon which bounds the said space, and means for holding the member in various positions of adjustment about its pivot.

20. A process for preparing wire for the manufacture of grommets or other uses, comprising feeding a length of wire through a spiralling device and rendering said spiralling device inoperative for a predetermined period without interrupting the movement of the wire.

21. A process for preparing wire for the manufacturing of grommets or other uses, comprising feeding a length of wire through a spiralling device and rendering said device inoperative without interrupting the movement of the wire.

22. A process for the purposes set forth comprising feeding a length of wire continuously and spiralling certain portions of the wire while preserving the wire unchanged between such spiralled portions.

23. In a machine for the purposes set forth, the combination of feed rollers for wire, a spiralling device device and means for rendering the spiralling device inoperative at intervals whereby straight and spiral portions are formed in the wire.

24. In a machine for the purposes set forth, the combination of means for feeding a wire and a spiralling device through which the wire passes and means for rendering the spiralling device inoperative at intervals, said last-named means being operative during the continuous feeding of the wire.

25. A machine for making grommets, comprising the combination of a support for the grommet being made, a die having a spiral passage therethrough, means for forcing wire through the passage of the die, means for producing a spiral conformation of the wire so issuing, and means for rendering the last named means inoperative to cause the wire to issue as straight wire.

26. A machine for making grommets comprising the combination of a support for the grommet being made, a die having a spiral passage therethrough, means for forcing wire through the passage of the die, means for causing the wire to issue from the die as spiralled wire and for applying this spiralled wire to the surface of the grommet being formed, means for rendering the last named means inoperative to cause the wire to issue from the die as straight wire, and means to control the action of said last named means.

27. A machine for making grommets comprising the combination of a support for the grommet being made, a die having a spiral passage therethrough, means for forcing wire through the passage of the die, means for causing the wire to issue from the die as spiralled wire, and to apply this spiralled wire to the surface of the grommet being formed, means for rendering the last named means inoperative to cause the wire to issue from the die as straight wire, and means operating after a predetermined length of wire has been laid on said grommet to actuate the last named means.

28. A machine for making grommets, comprising the combination of a support for the grommet being made, two shuttles through which the grommet passes, a die, wire-feeding means, and a support for a supply of wire mounted on one of the shuttles, means rotating the shuttles simultaneously at different speeds to cause the wire to issue from the die as spiralled wire and to apply it to the surface of the grommet being made, means to render said rotating means inoperative as to one shuttle, and means automatically operating to control said last named means.

29. A machine for making grommets, comprising the combination of a support for the grommet being made, two shuttles through which the grommet passes, a die, wire-feeding means, and a support for a supply of wire mounted on one of the shuttles, means for rotating the shuttles simultaneously at different speeds to cause the wire to issue from the die as spiralled wire and to apply it to the surface of the grommet being made, means to render said rotating means inoperative as to one shuttle, and means effective to oppose the further rotation of said shuttle upon the rotating means being so rendered inoperative.

30. A machine for making grommets, comprising the combination of a support for the grommet being made, two shuttles through which the grommet passes, a die, wire-feeding means, and a support for a supply of wire mounted on one of the shuttles, means for rotating the shuttles simultaneously at different speeds to cause the wire to issue from the die as spiralled wire and to apply it to the surface of the grommet being made, means to render said rotating means inoperative as to one of said shuttles to cause the wire to issue from said die as straight wire, and braking means operable to oppose the further rotation of said shuttle upon the rotating means being so rendered inoperative.

31. In a machine for making grommets, a support providing a space within which the grommet is made by the machine, a member mounted on the support and having a wall which bounds the said space and means for holding the member in various positions relative to said support to vary the dimensions of said space.

In testimony whereof I affix my signature.

ALPHONSO COMSTOCK PRATT.